United States Patent
Yoshida

(10) Patent No.: US 9,189,140 B2
(45) Date of Patent: Nov. 17, 2015

(54) IMAGE PROCESSING APPARATUS, CONTROL METHOD THEREOF AND STORAGE MEDIUM STORING PROGRAM

(71) Applicant: CANON KABUSHIKI KAISHA, Tokyo (JP)

(72) Inventor: Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 269 days.

(21) Appl. No.: 13/749,124

(22) Filed: Jan. 24, 2013

(65) Prior Publication Data

US 2013/0212531 A1      Aug. 15, 2013

(30) Foreign Application Priority Data

Feb. 9, 2012   (JP) ................................. 2012-026424

(51) Int. Cl.
   *G06F 3/048* (2013.01)
   *G06F 3/0485* (2013.01)
   *G06F 3/0482* (2013.01)

(52) U.S. Cl.
   CPC ............ *G06F 3/0485* (2013.01); *G06F 3/0482* (2013.01)

(58) Field of Classification Search
   CPC .............................. G06F 3/0482; G06F 3/0485
   See application file for complete search history.

(56) References Cited

U.S. PATENT DOCUMENTS

| | | | |
|---|---|---|---|
| 7,421,124 B2 | 9/2008 | Kitora et al. | |
| 7,508,547 B2 | 3/2009 | Nishikawa et al. | |
| 7,532,757 B2 | 5/2009 | Yoshida et al. | |
| 7,542,605 B2 | 6/2009 | Yoshida | |
| 7,640,269 B2 | 12/2009 | Yoshida et al. | |
| 7,860,266 B2 | 12/2010 | Sekiguchi et al. | |
| 8,887,085 B1 * | 11/2014 | Cox et al. | 715/786 |
| 2003/0128192 A1 * | 7/2003 | van Os | 345/173 |
| 2007/0061488 A1 * | 3/2007 | Alagappan et al. | 709/246 |
| 2007/0150830 A1 * | 6/2007 | Ording et al. | 715/784 |
| 2009/0327915 A1 * | 12/2009 | Holdaway et al. | 715/745 |
| 2010/0058240 A1 | 3/2010 | Bull et al. | |
| 2012/0331398 A1 * | 12/2012 | Madnani | 715/752 |

FOREIGN PATENT DOCUMENTS

| | | |
|---|---|---|
| JP | 2011-530738 A | 12/2011 |
| WO | 2010-024969 A | 3/2010 |

* cited by examiner

*Primary Examiner* — Claudia Dragoescu
(74) *Attorney, Agent, or Firm* — Fitzpatrick, Cella, Harper & Scinto

(57) ABSTRACT

An image processing apparatus that displays a list of items and a control method thereof, wherein the displayed list of items is displayed by sliding in response to an instruction operation by a user, if it is determined that there is a change in an item that needs to be displayed in the list, the user is notified of the fact that there is a change in the displayed list of items by, for example, stopping the slide display or performing highlighted display.

16 Claims, 13 Drawing Sheets

F I G. 7

| UUID | NAME | STORAGE ADDRESS |
|---|---|---|
| 000001 | Doc1 | /BOX/Document/Doc1 |
| 000002 | Doc2 | /BOX/Document/Doc2 |
| 000003 | Doc3 | /BOX/Document/Doc3 |
| 000004 | Doc4 | /BOX/Document/Doc4 |
| 000005 | Doc5 | /BOX/Document/Doc5 |
| 000006 | Doc6 | /BOX/Document/Doc6 |

FIG. 10

| UUID | JOB NAME | USER NAME |
|---|---|---|
| 0001 | job1 | user1 |
| 0002 | job2 | user1 |
| 0003 | job3 | user1 |
| 0004 | job4 | user2 |
| 0005 | job5 | user3 |
| 0006 | job6 | user1 |
| 0007 | job7 | user1 |
| 0008 | job8 | user1 |
| 0009 | job9 | user1 |
| 0010 | job10 | user3 |

FIG. 11

| UUID | USER NAME | ADDRESS |
|---|---|---|
| 0001 | user1 | user1@abc.co.jp |
| 0002 | user2 | user2@abc.co.jp |
| 0003 | user3 | user3@abc.co.jp |
| 0004 | user4 | user4@abc.co.jp |
| 0005 | user5 | user5@abc.co.jp |
| 0006 | user6 | user6@abc.co.jp |
| 0007 | user7 | user7@abc.co.jp |
| 0008 | user8 | user8@abc.co.jp |
| 0009 | user9 | user9@abc.co.jp |
| 0010 | user10 | user10@abc.co.jp |

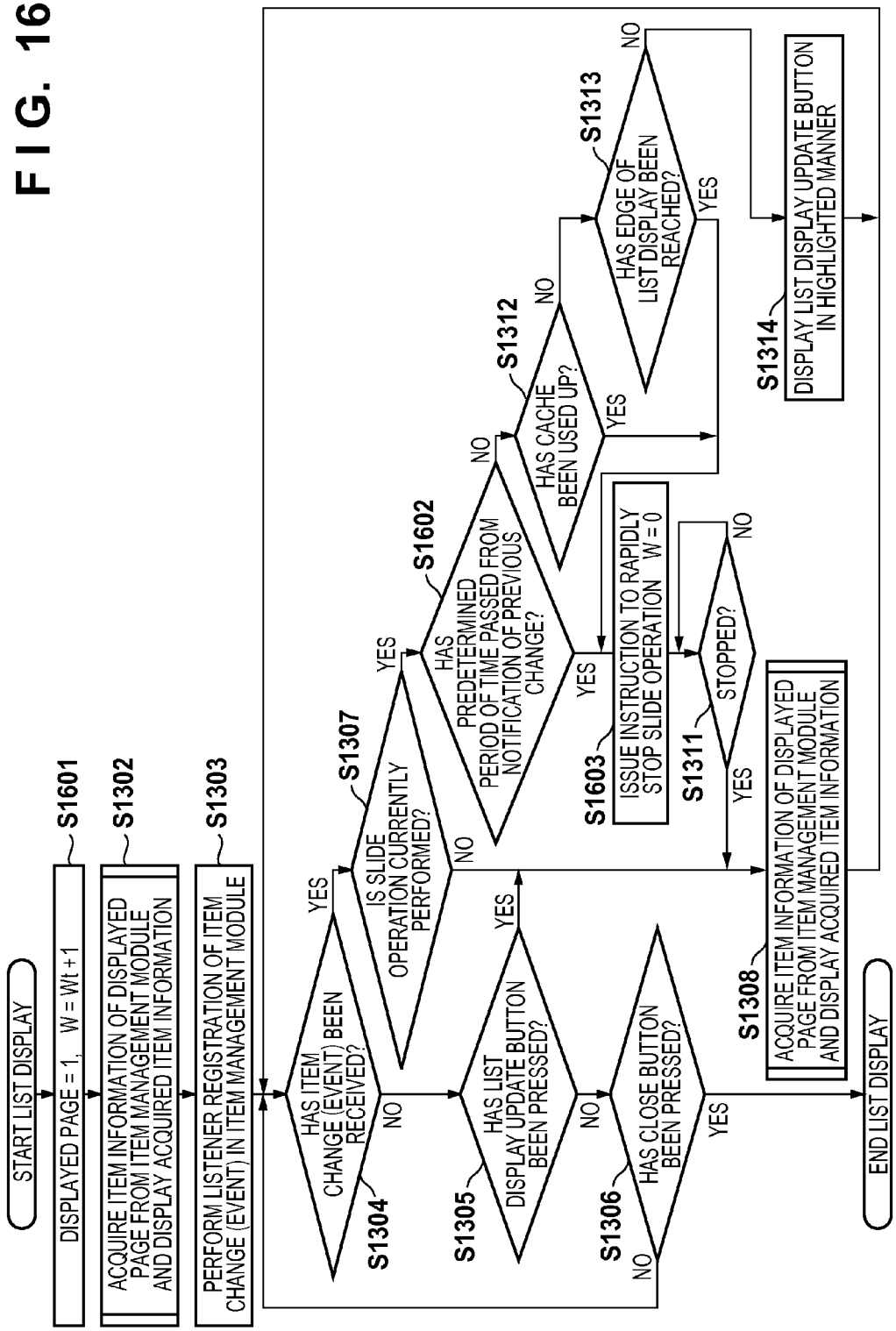

IMAGE PROCESSING APPARATUS, CONTROL METHOD THEREOF AND STORAGE MEDIUM STORING PROGRAM

BACKGROUND OF THE INVENTION

1. Field of the Invention

The present invention relates to an image processing apparatus that displays a list of items, a control method thereof, and a storage medium storing a program.

2. Description of the Related Art

With conventional multifunction peripherals (hereinafter, MFPs), when displaying a list screen showing, for example, thumbnail images or a list on a manipulation unit, if there are items that do not fit to the single screen, such items that are not displayed are viewed by a user pressing a page turn button, a scroll button or the like. In contrast, recently, there are some mobile devices that allow users to perform a slide manipulation (gesture manipulation) on a list screen that displays a list. The slide manipulation is an operation that implements ease of manipulation by users that is intuitive by expressing a list screen on the manipulation screen as if physically present. Specifically, the user can regard the list screen as a physical medium such as paper, and touch the list screen with his/her finger so as to move what is displayed, and then lift the finger from the screen. The velocity at the time when the user lifts the finger is set as the initial velocity, and while its velocity and direction are maintained according to the law of inertia, which is one of the laws of physics, the screen is slid by deceleration due to virtual friction and eventually the slide stops.

However, in reality, the items displayed on the list screen are those that are dynamically changed, which is different from the case where physical media are handled. With respect to the slide manipulation on the list screen implemented with mobile devices, Japanese Patent Laid-Open No. 2011-530738 takes the following two approaches to such items that are dynamically changed:

(1) items displayed on a list screen are dynamically changed while being slid; and (2) cached items are kept displayed and no dynamic change is displayed until the content of a changed item is re-acquired.

This is because the items displayed on the list screen of mobile devices are mostly those (an address book, a storage document, and the like) that are not changed without manipulation by the user, and thus importance is not placed on a dynamic change of displayed items.

However, with MFPs, how to notify the user of such a dynamic change of the items is important. For example, if the items regarding the job status displayed on the list screen are not updated and thus not new, the user who came to the MFP so as to check when a print job input by the user is to be executed cannot notice, even if the print job has been completed, that fact. In this case, a situation may occur in which the printed product printed by the print job is slipped into other printed products and taken away by somebody else. Alternatively, a situation may occur in which when sending a facsimile or the like, the user cannot find the transmission job that the user wants to stop, and the facsimile is sent.

In order to avoid such problems, with a conventional MFP, such a change in the items displayed on the list screen is detected by the fact that the page turn button or a screen update button has been pressed by the user, or by the fact that a poll or event has been received. Then, latest information is acquired at that timing, and the content displayed on the list screen is updated.

Problems that arise in the above example will be described below.

The user who came to the MFP so as to check when a print job input by the user is to be executed flicks the list screen showing the job execution status so as to perform slide display. At this time, with this slide display, the items displayed on the list screen are sequentially slid and displayed in the display area, but the finished jobs disappear from the items displayed on the list screen showing the job status.

As in (1) mentioned above, when the items displayed on the list screen are dynamically changed by sliding, the displayed items are slid and then disappear. In this case, the user simultaneously sees both changes due to the displayed items being slid by flicking and changes in the displayed items due to changes in jobs. This causes a problem in that it is very difficult for the user to check the displayed items, and the user may not notice a change in the jobs.

In the case of (2) mentioned above, the items displayed on the list screen are not dynamically changed, and thus the user cannot notice an actual change of the job status.

As described above, in the case where the conventional technique for mobile devices is applied to MFPs, problems arise such as even if a change occurs in the displayed items during slide operation on the list screen, the displayed items are not updated to latest ones. Alternatively, if many changes occur in the displayed items, the user cannot notice the changes in the displayed items.

SUMMARY OF THE INVENTION

An aspect of the present invention is to eliminate the above-mentioned problems with the conventional technology.

The present invention provides a technique with which when a change occurs in displayed items while a list display is displayed by sliding, the user can notice the change in the items.

The present invention in its first aspect provides an image processing apparatus that displays a list of items, the apparatus comprising: a slide display unit configured to display by sliding the displayed list of items in response to a user instruction operation; a determination unit configured to determine whether or not there is a change in an item that needs to be displayed in the list; and a notification unit configured to, if the determination unit determines that there is a change in the item that needs to be displayed in the list, notify a user that there is a change in the displayed list of items.

The present invention in its second aspect provides a control method for controlling an image processing apparatus that displays a list of items, the method comprising: a slide display step of displaying by sliding the displayed list of items in response to a user instruction operation; a determining step of determining whether or not there is a change in an item that needs to be displayed in the list; and a notification step of, if it is determined in the determining step that there is a change in the item that needs to be displayed in the list, notifying a user that there is a change in the displayed list of items.

The present invention in its third aspect provides a computer-readable storage medium storing a program that causes a computer to execute the following: a slide display step of displaying by sliding a displayed list of items in response to a user instruction operation; a determining step of determining whether or not there is a change in an item that needs to be displayed in the list; and a notification step of, if it is determined in the determining step that there is a change in the item that needs to be displayed in the list, notifying a user that there is a change in the displayed list of items.

According to the present invention, even when a change occurs in displayed items while a list display is displayed by sliding, the user can notice the change in the items.

Further features of the present invention will become apparent from the following description of exemplary embodiments with reference to the attached drawings.

BRIEF DESCRIPTION OF THE DRAWINGS

FIG. 7 is a diagram showing an example of document management data.

FIG. 10 is a diagram showing an example of list data of a job list according to Embodiment 1.

FIG. 11 is a diagram showing an example of list data of an address book according to Embodiment 1.

FIG. 16 is a flowchart illustrating an operation of a list display module according to Embodiment 3 of the present invention.

DESCRIPTION OF THE EMBODIMENTS

Figure 1:
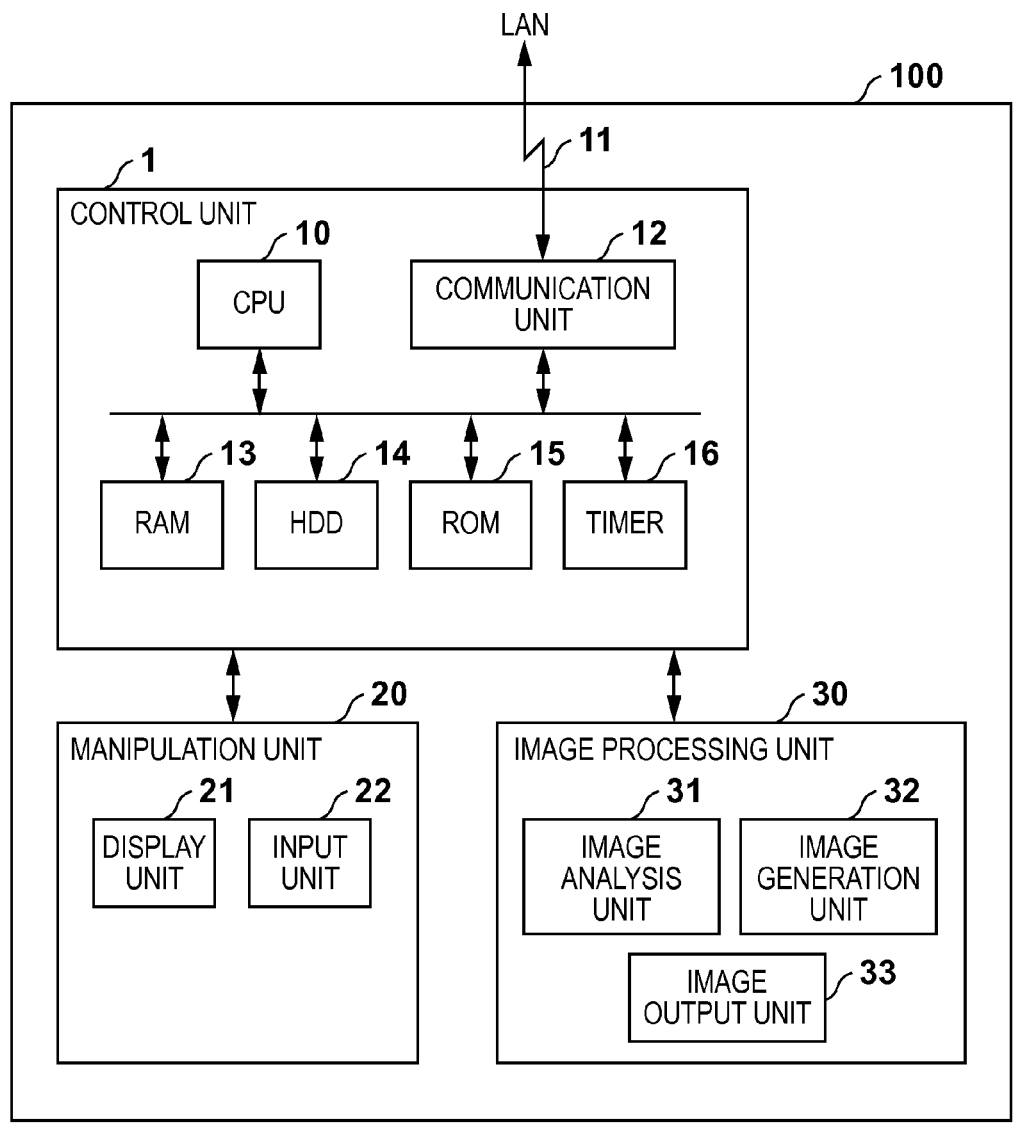
FIG. 1 is a block diagram illustrating a configuration of an MFP according to Embodiment 1 of the present invention.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same reference numerals are given to the same constituent elements, and a description thereof is omitted here. In the following embodiments of the present invention, embodiments of an image processing apparatus according to the present invention will be described taking a multifunction peripheral (MFP) as an example.

FIG. 1 is a block diagram illustrating a configuration of an MFP 100 according to Embodiment 1 of the present invention.

A control unit 1 controls operations of constituent units of the MFP 100. The control unit 1 includes a CPU 10, a LAN 11, a communication unit 12, a RAM 13, a HDD 14, and a ROM 15. The CPU 10 performs overall control of the control unit 1. The LAN 11 indicates a network for exchanging data with an external apparatus, and the MFP 100 is connected to the Internet via the LAN 11. The communication unit 12 performs transmission and reception of data via the LAN 11. The RAM 13 provides a system work memory for the CPU 10 to perform operations. The HDD 14 is a hard disk drive, and may be a storage medium such as, for example, a magnetic disk, an optical medium or a flash memory. The HDD 14 is capable of storing document data, settings data, and the like. The HDD 14 does not necessarily have to be located in the MFP 100. An external server, PC or the like may be used as a storage device via the communication unit 12. The ROM 15 is a boot ROM in which a system boot program is stored. With the ROM 15, which is a boot ROM, the CPU 10 expands a program installed on the HDD 14 into the RAM 13, and performs various types of control operations based on the program. A timer 16 measures the passage of time in response to an instruction from the CPU 10, and notifies the CPU 10 that the specified time has elapsed by an interruption or the like.

A manipulation unit 20 is controlled by the control unit 1, and includes a display unit 21 and an input unit 22. The display unit 21 is a display for displaying information regarding the copying machine to the user. The input unit 22 receives input from the user via an interface such as, for example, a touch panel, a mouse, a camera, voice input, or a keyboard.

An image processing unit 30 is controlled by the control unit 1, and includes an image analysis unit 31, an image generation unit 32, and an image output unit 33. The image analysis unit 31 analyzes the structure of an original image, and extracts necessary information from the result of analysis. The image generation unit 32 reads (scans, for example) an original, and thereby digitalizes the original image to generate image data, and stores the generated data in the HDD 14. The image generation unit 32 is also capable of generating original image data in another format by using information analyzed by the image analysis unit 31. The image output unit 33 outputs image data stored in the HDD 14 or the like. Examples of the output method include: printing original image data on paper; transmitting data to an external device, a server, a facsimile apparatus or the like connected to a network via the communication unit 12; storing data in a storage medium connected to the MFP 100; and the like.

Figure 2:
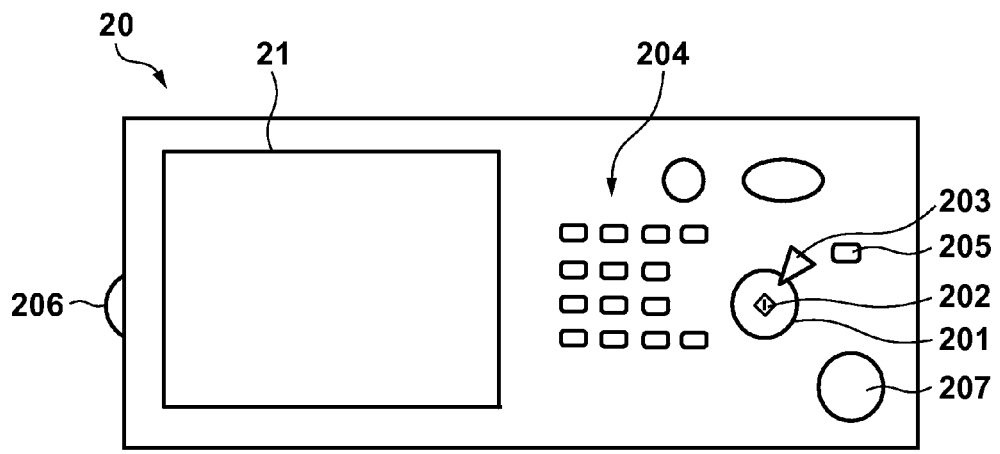
FIG. 2 is a schematic diagram of a manipulation unit according to Embodiment 1.

FIG. 2 is a schematic diagram of the manipulation unit 20 according to Embodiment 1.

The display unit 21 is, in this example, a liquid crystal display unit in which a touch panel sheet is attached to a liquid crystal. The display unit 21 displays a manipulation screen and soft keys, and when one of the displayed keys is pressed, transmits information regarding the position of the pressed key to the CPU 10. Accordingly, in this case, the display unit 21 also functions as the input unit 22.

Next, various types of keys and buttons manipulated by the user will be described. A start key 201 is used to issue an instruction to start a reading operation of an original. The start key 201 includes, at the center thereof, an LED 202 with two colors (green and red) that indicates whether the start key 201 is available depending on the color. A stop key 203 functions to stop ongoing operations. A numeric keypad 204 is composed of numeric and letter buttons, and is used to provide instructions such as setting the number of copies and switching the screen of the display unit 21. A user mode key 205 is pressed when equipment setting is performed. A dial 206 and a trackball 207 are both used for input of slide operation control, which will be described later.

A preview function according to Embodiment 1 of the present invention will be described next.

In Embodiment 1 of the present invention, the preview function (hereinafter referred to as a "preview") is a function that displays image data stored in the HDD 14 on the display unit 21. Also, the image analysis unit 31 computerizes the original image, and the image generation unit 32 generates image data in a format suitable to be displayed on the display unit 21. Hereinafter, image data suitable to be displayed on the display unit 21 is referred to as a "preview image". Also, the original image has one or more pages, and a preview image is generated for each page.

The MFP 100 is also capable of storing original image data on the HDD 14 by one or more methods. The MFP 100 is also capable of reading an original placed on a scanner, namely, an original platen or an ADF (automatic document feeder) via the image generation unit 32, and generating image data of the original through digitization. The MFP 100 is also capable of copying or moving image data with a desired server via the communication unit 12. Furthermore, a storage medium such as a portable medium can be inserted into the MFP 100, and thus image data can be copied or moved from the storage medium to the HDD 14.

Figure 3:
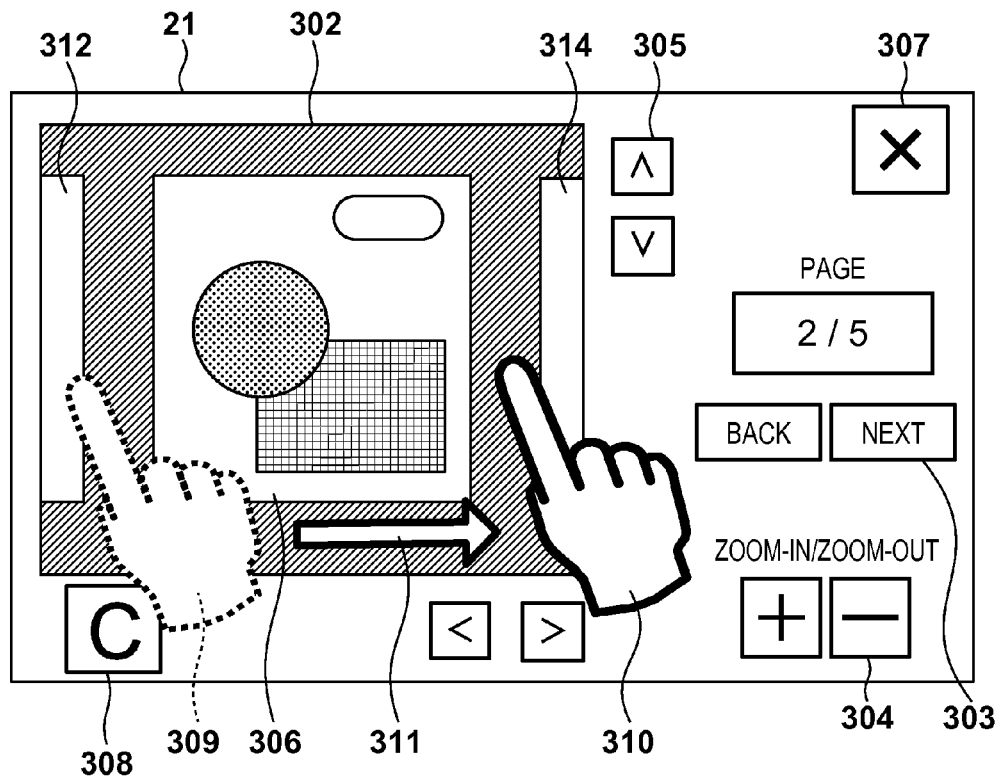
FIG. 3 is a diagram showing an example of a preview screen displayed on a display unit of the MFP according to Embodiment 1 of the present invention.

FIG. 3 is a diagram showing an example of a preview screen displayed on the display unit of the MFP according to Embodiment 1 of the present invention.

The preview screen is a screen for displaying a preview image, and includes a preview display region 302, page scroll buttons 303, zoom-in and zoom-out buttons 304, a display region move button 305, a close button 307, and a list display update button 308. The preview display region 302 is a display region for displaying a preview image 306. A plurality of preview images may be simultaneously displayed in the preview display region 302. In FIG. 3, as an example, only one preview image is displayed in the preview display region 302. However, in order to indicate that there are previous and next pages before and after the displayed preview image, preview images 312 and 314 of the previous and next pages are partly shown at both sides of the preview display region 302. The page scroll buttons 303 are control buttons for, when there are previous and next pages before and after the displayed preview image, changing the preview image displayed in the preview display region 302 to a page in a direction instructed by the user. The zoom-in and zoom-out buttons 304 are control buttons for changing the zoom scale of the preview image 106 displayed in the preview display region 302. The zoom scale is divided into one or more levels, and thus can be changed to a desired scale in response to an instruction from the user. The display region move button 305 is a control button for changing the display position of the preview image 106 displayed in the preview display region 302. When the zoom scale is increased by using the zoom-in and zoom-out buttons 304, a situation can occur in which only a part of the preview image 106 is displayed in the preview display region 302. If such a situation occurs, the display region move button 305 can be used to display a desired position of the preview image 106. The close button 307 is a control button for closing the preview screen to transition the screen to another screen, and also for deactivating the preview function. If the list display update button 308 is pressed by the user, display information is acquired again, and the content displayed in the preview display region 302 is updated to the latest content.

FIG. 3 also shows, by taking a preview screen as an example, how the displayed list of items are controlled with a gesture manipulation.

In order to receive a gesture manipulation, the input unit 22 stores the trajectory of the input pointer when an input pointer is moved by the user. Specifically, the input unit 22 can acquire the coordinates of the input pointer displayed on the display unit 21. The input unit 22 can acquire discrete coordinates of the input pointer by acquiring the coordinates of the input pointer at a regular interval. The input unit 22 stores the acquired coordinates of the input pointer in the RAM 13. The input unit 22 can obtain the trajectory of the input pointer by vectoring the coordinates stored in a predetermined period of time. The input unit 22 determines whether the trajectory of the input pointer matches a predetermined gesture manipulation, and if the trajectory of the input pointer matches the predetermined gesture manipulation, can receive the input as a gesture manipulation.

Among gesture manipulations, there are gesture manipulations generally called "tapping", "double tapping", "dragging", "flicking" and "pinching". Tapping refers to a manipulation of striking the screen lightly with the finger once, and corresponds to clicking with a mouse. Double tapping refers to a manipulation of tapping twice in succession, and corresponds to double clicking with a mouse. Dragging refers to a manipulation of sliding the finger during a single tap. Flicking is a manipulation similar to dragging, and refers to a manipulation of lifting the finger from the screen while maintaining the movement velocity. Pinching is a general term for manipulations of touching the screen with two fingers. Particularly, the manipulation of spreading two fingers apart is called "pinching out", and the manipulation of bringing two fingers together is called "pinching in".

FIG. 3 shows how to perform control to change a page by flicking instead of using the page scroll buttons 303. In the diagram, a predetermined gesture manipulation is to move in the right and left directions. FIG. 3 shows an example of flicking in the right direction by performing a manipulation of tapping the finger at a position indicated by 309, dragging the finger in the right direction as indicated by an arrow 311, and lifting the finger at a position indicated by 310 while maintaining the velocity. This allows a preview image corresponding to the previous page to be displayed by sliding. Flicking in the opposite direction, or in other words, in the left direction allows a preview image corresponding to the next page to be displayed by sliding.

Figure 4:
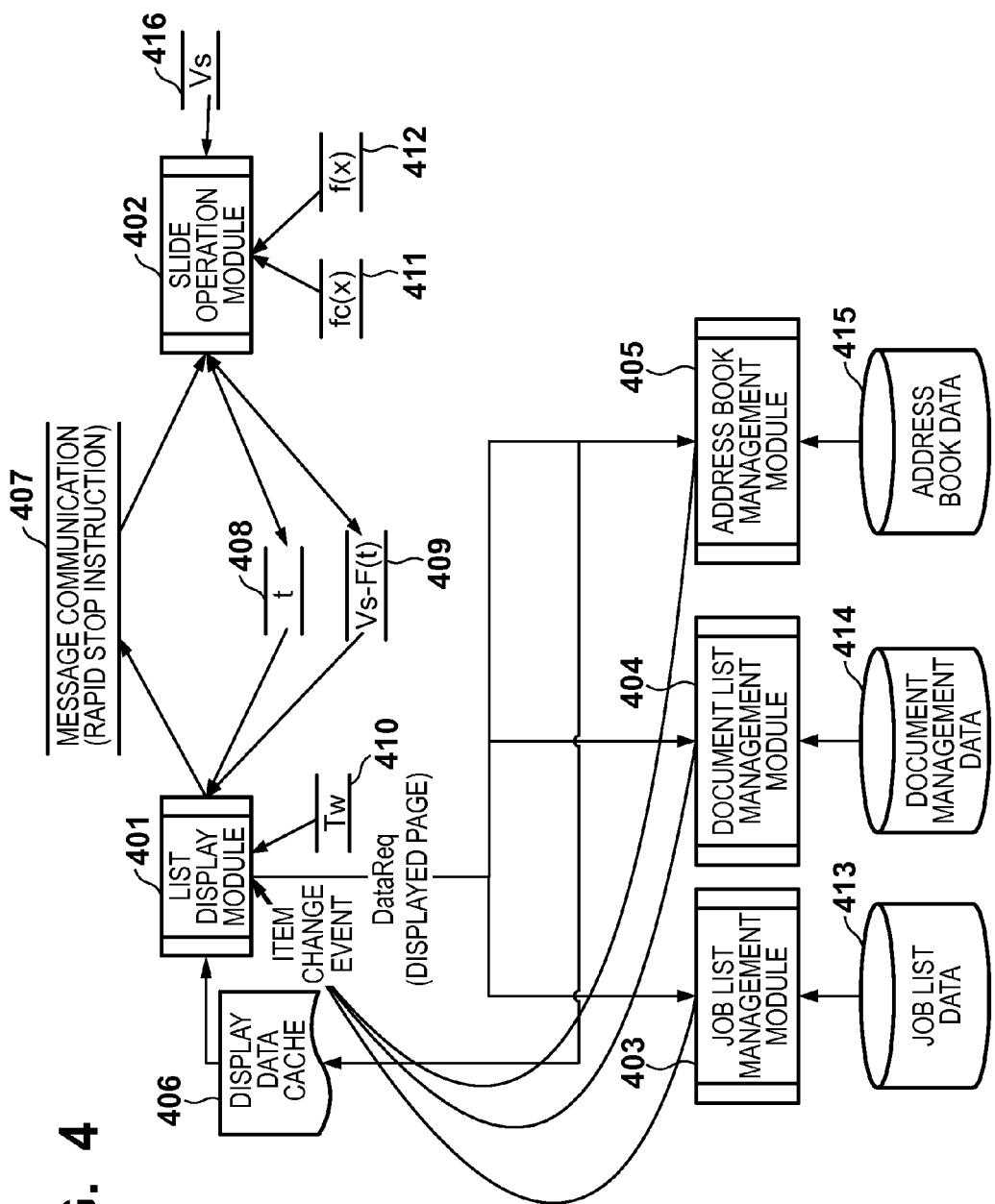
FIG. 4 is a configuration diagram of software of the MFP according to Embodiment 1 of the present invention.

FIG. 4 is a configuration diagram of software of the MFP according to Embodiment 1 of the present invention.

A list display module 401 is a module that is executed when the CPU 10 displays a list screen. This operational flow will be described later with reference to FIG. 13. A slide operation module 402 is a module that is activated when the CPU 10 has determined that the list screen is to be displayed by sliding by flicking or the like, which will be described later. The operational flow will be described later with reference to FIG. 6. A job list management module 403, a document list management module 404, and an address book management module 405 are resident modules, and are activated after the MFP 100 has been activated. The job list management module 403, the document list management module 404 and the address book management module 405, which are resident modules, are capable of referring to job list data 413, document management data 414, and address book data 415, respectively.

A cooperative operation of these modules will be described next.

Figure 13:
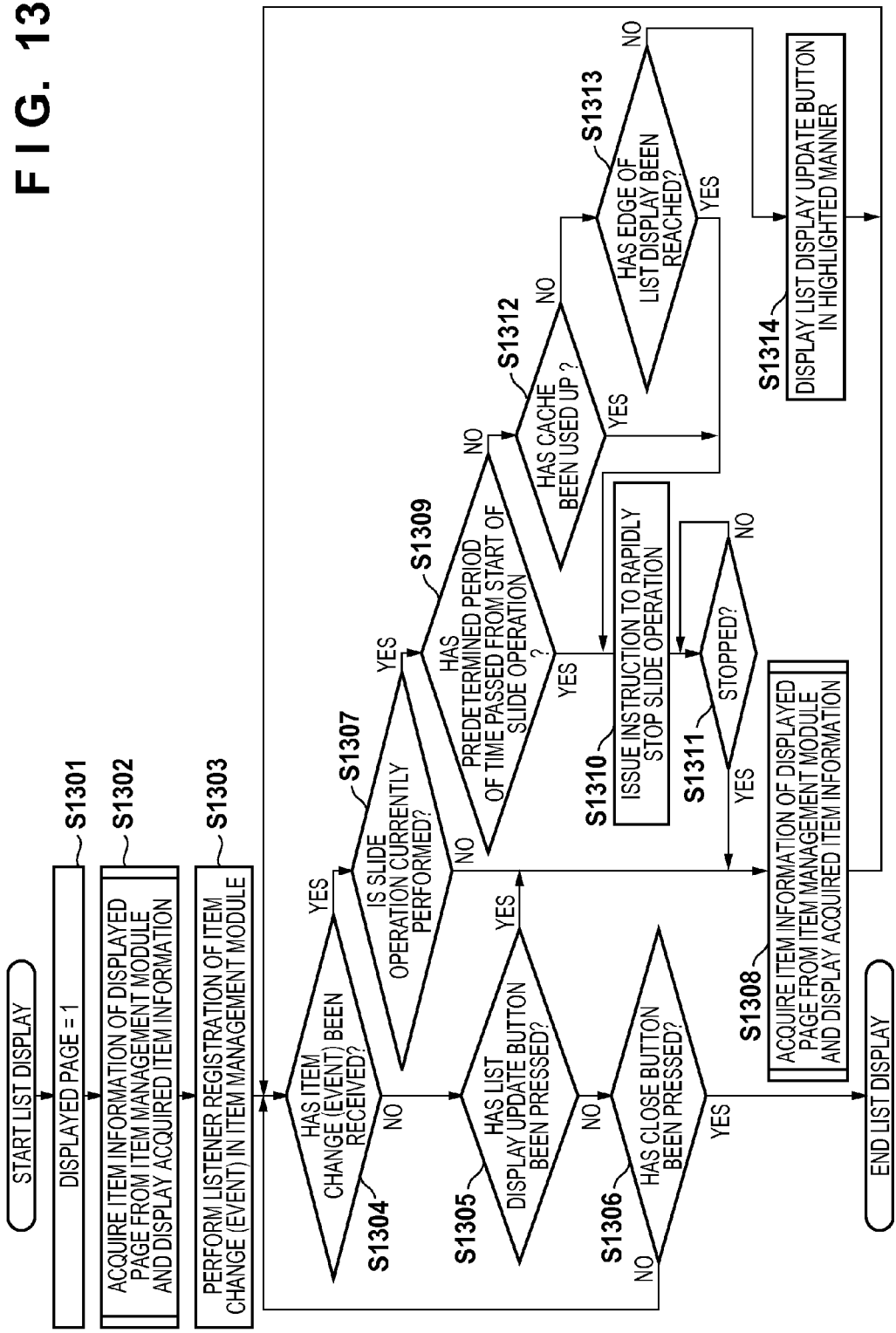
FIG. 13 is a flowchart illustrating an operation of a list display module according to Embodiment 1 of the present invention.

When activated by the CPU 10, the list display module 401 performs operations in accordance with the operational flow shown in FIG. 13. In other words, in order to acquire display data from the job list management module 403, the document list management module 404, and the address book management module 405, the list display module 401 issues a DataReq (data request). Upon receiving the DataReq, the modules 403 to 405 read data from the list item data (the job list data 413, the document management data 414, and the address book data 415) managed by these modules, and send the data to the list display module 401. The list display module 401 stores the data in a display data cache 406. The list display module 401 refers to, for operation control, a predetermined period of time Tw 410, a slide duration time t 408 that is updated by the slide operation module 402, and Vs−F(t) 409, and issues a rapid stop instruction to the slide operation module 402 via message communication 407. The slide operation module 402 refers to an initial velocity Vs 416, a normal deceleration formula f(x) 412 and rapid deceleration formula fc(x) 411, and updates the slide duration time t 408 and the velocity (Vs−F(t)) 409.

A slide operation by flicking will be described with reference to FIGS. 5 and 6.

Figure 5:
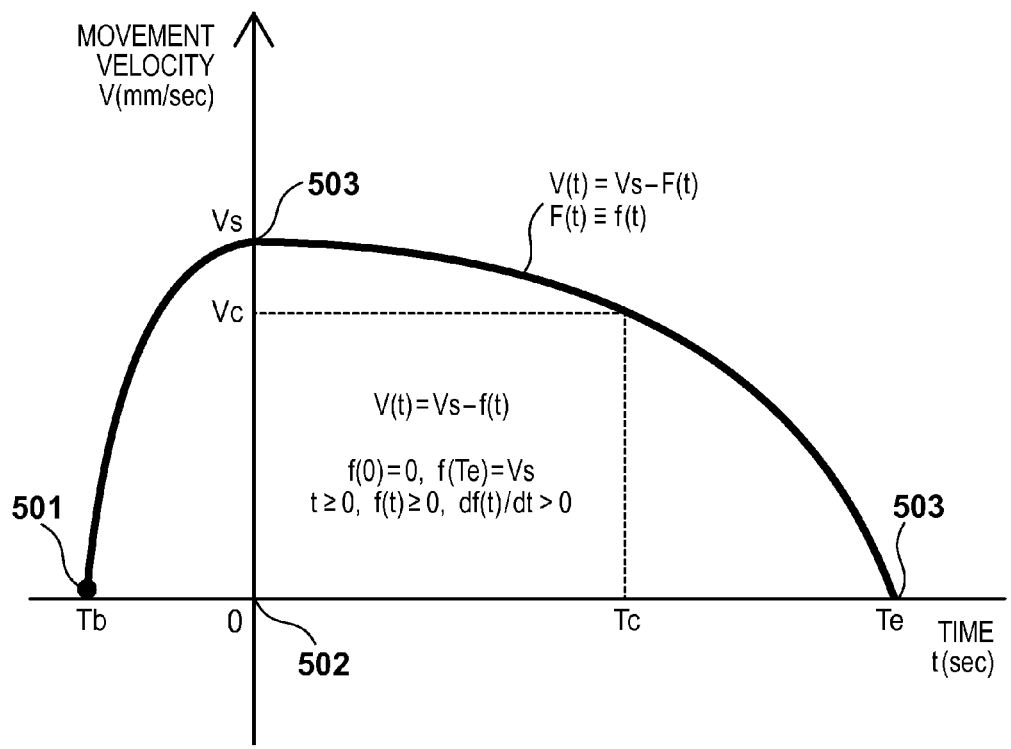
FIG. 5 is a diagram illustrating a velocity curve using a normal deceleration formula of a slide operation.

FIG. 5 is a diagram illustrating a velocity curve using a normal deceleration formula of a slide operation.

Tb 501 is the time (t) when the user starts tapping, and from which the user increases the drag movement velocity to Vs 503 and lifts the finger at t (=0) 502. Upon detection of this flicking manipulation being performed, the CPU 10 activates the slide operation module 402 for slide operation shown in the flowchart of FIG. 6. Here, the drag velocity V represents only a component in the right-left direction of the drag velocity by the user. Since the slide velocity V from t=tb 501 to t=0 (503) follows the drag velocity by the user, a curve that rises simply as shown in FIG. 5 is not always obtained.

Figure 6:
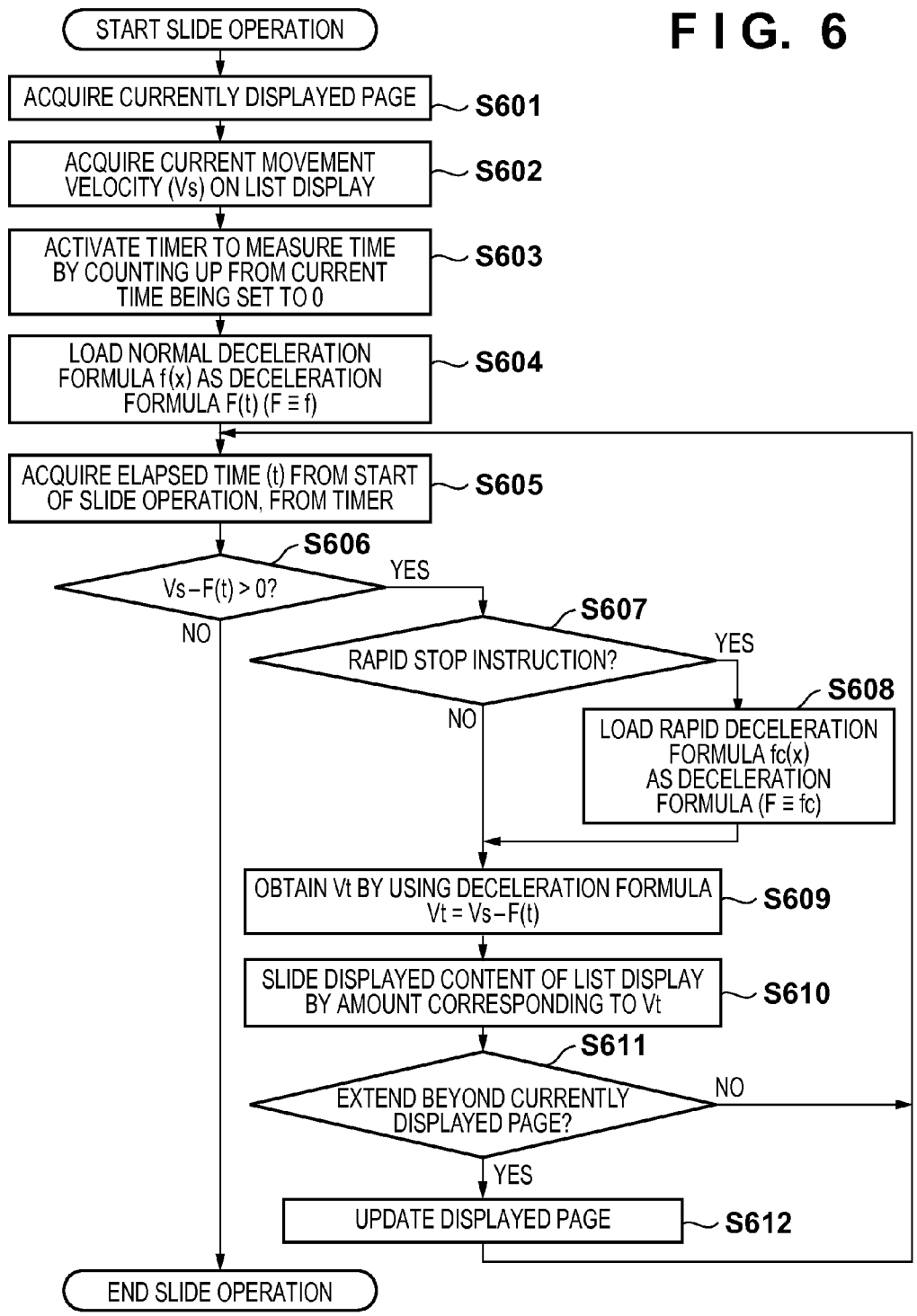
FIG. 6 is a flowchart illustrating processing of a slide operation module.

FIG. 6 is a flowchart illustrating processing of the slide operation module. A program that executes this flowchart has been installed on the HDD 14, and is expanded into the RAM 13 at the time of execution, and then executed under control of the CPU 10.

This processing starts upon start of a slide operation by flicking performed by the user. First, in S601, the CPU 10 acquires page information of the currently displayed page. Next, the procedure advances to S602, where the CPU 10 acquires the drag velocity Vs 503 at t=0 (503) when the user lifted the finger. Then, the procedure advances to S603, where the CPU 10 causes the timer 16 to start measuring time by counting up from the current time indicated by the timer 16 being set to t=0. Next, the procedure advances to S604, where, as a deceleration formula F(t), the normal deceleration formula f(x) 412 is loaded (F f). Next, the procedure advances to S605, where the CPU 10 acquires, from the timer 16, elapsed time (t) from the start of the slide operation.

Then, the procedure advances to S606, where it is determined whether or not the velocity (Vs−F(t)) 409 is 0 or greater. At this time, if Vs−F(t)=0, the slide operation ends. This corresponds to the state at Te 505 in FIG. 5. If, on the other hand, (Vs−F(t))>0, the procedure advances to S607, where it is determined whether there is a rapid stop instruction 407, which will be described later. If it is determined in S607 that there is no rapid stop instruction, the procedure advances to S609. If it is determined that there is a rapid stop instruction, the procedure advances to S608, where, as a deceleration formula F(t), the rapid deceleration formula fc(x) 411 is loaded (F=fc), and the procedure then advances to S609. The rapid deceleration formula fc(x) performs deceleration by increasing the deceleration rate to be higher than the original deceleration rate. In S609, regardless of whether there is a rapid stop instruction, the velocity Vt=Vs−F(t) 409 is obtained by using the deceleration formula. Then, the procedure advances to S610, where the CPU 10 slides the displayed content of the list display by an amount corresponding to the velocity Vt. Then, the procedure advances to S611, where it is determined, as a result of the content being slid in S610, whether the displayed page extends beyond the currently displayed page. If it is determined that the displayed page extends beyond the currently displayed page, the procedure advances to S612, where the displayed page is updated, and the procedure then advances to S605. If it is determined in S611 that the displayed page does not extend beyond the currently displayed page, the procedure also advances to S605.

In this manner, by flicking by the user, the items displayed on the list screen can be slid and displayed while performing deceleration by virtual friction.

FIG. 7 is a diagram showing an example of document management data.

Here, if it is assumed that in the state shown in FIG. 3, a document corresponding to the preview image 306 is UUID "000003" of the document management data 414 shown in FIG. 7, the displayed page is "000003". In S611, if it is determined that the displayed page will be changed to the preview image 312 (FIG. 3) before "000003", the displayed page is updated to "000002". If the screen is slid in the left direction, which is the direction opposite to the direction indicated by the arrow 311, and it is determined that the displayed page will be changed to the next preview image 314 (FIG. 3), the displayed page is updated to "000004".

Figure 8:
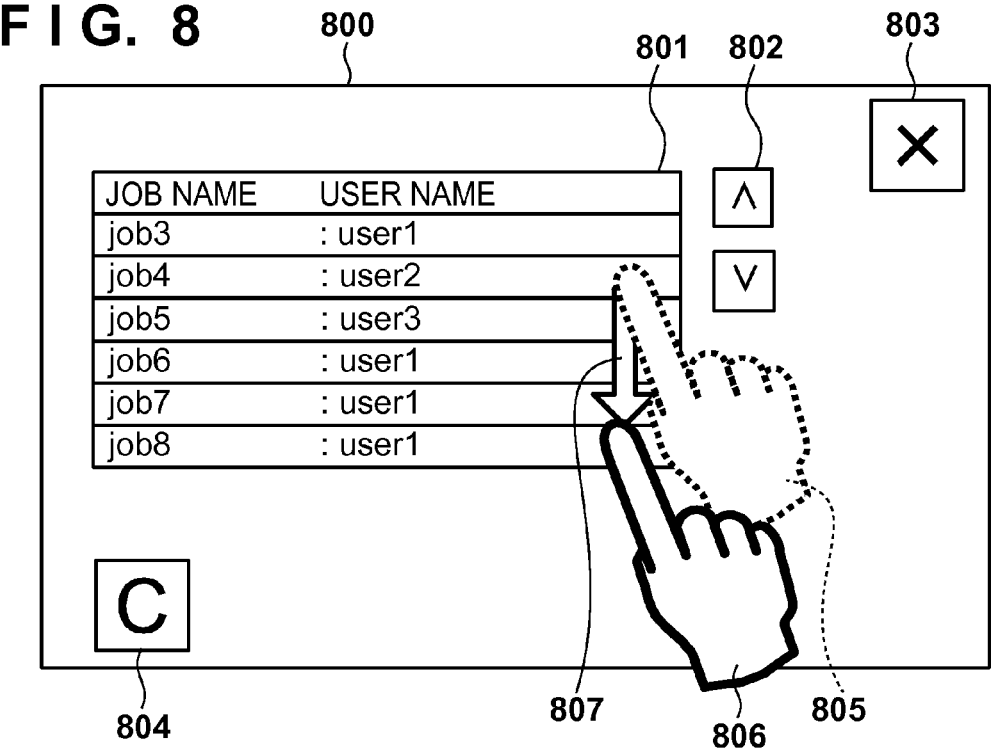
FIG. 8 is a diagram illustrating a slide operation by flicking on a job list.

Next, FIG. 8 is a diagram illustrating a slide operation by flicking on a job list. Hereinafter, the slide operation by flicking on a job list will be described with reference to FIG. 8.

A job list screen 800 includes a job list display portion 801, list scroll buttons 802, a screen close button 803, and a list display update button 804. In FIG. 8, a predetermined gesture manipulation is to move in the upper and lower directions. FIG. 8 shows an example of flicking in the lower direction by performing a manipulation of tapping the finger at a position indicated by 805, dragging the finger in the lower direction as indicated by an arrow 807, and lifting the finger at a position indicated by 806 while maintaining the velocity. As a result, a list corresponding to the upper page is slid and displayed. Flicking in the opposite direction (upper direction) causes a list corresponding to the lower page to be displayed by sliding.

The list display page is expressed by the first row of the list displayed on the list screen. Specifically, in the case of the display shown in FIG. 8, the first row is "job 3: user 1", and if the job list data 413 is data shown in FIG. 10, the displayed page is "0003". Then, by a slide operation by flicking as described above, "job 3: user 1" is slid in the lower direction, and at the time when a row above the first row needs to be displayed, it is determined in S611 that the displayed page extends beyond the currently displayed page. Then, the displayed page is updated to the previous page "0002" based on the data shown in FIG. 10. On the other hand, if a slide operation in the upper direction is performed by flicking in the opposite direction (upper direction), at the time when "job 3: user 1" is no longer displayed, it is determined in S611 that the displayed page extends beyond the currently displayed page, and the displayed page is updated to the next page "0004" based on the data shown in FIG. 10.

Figure 9:
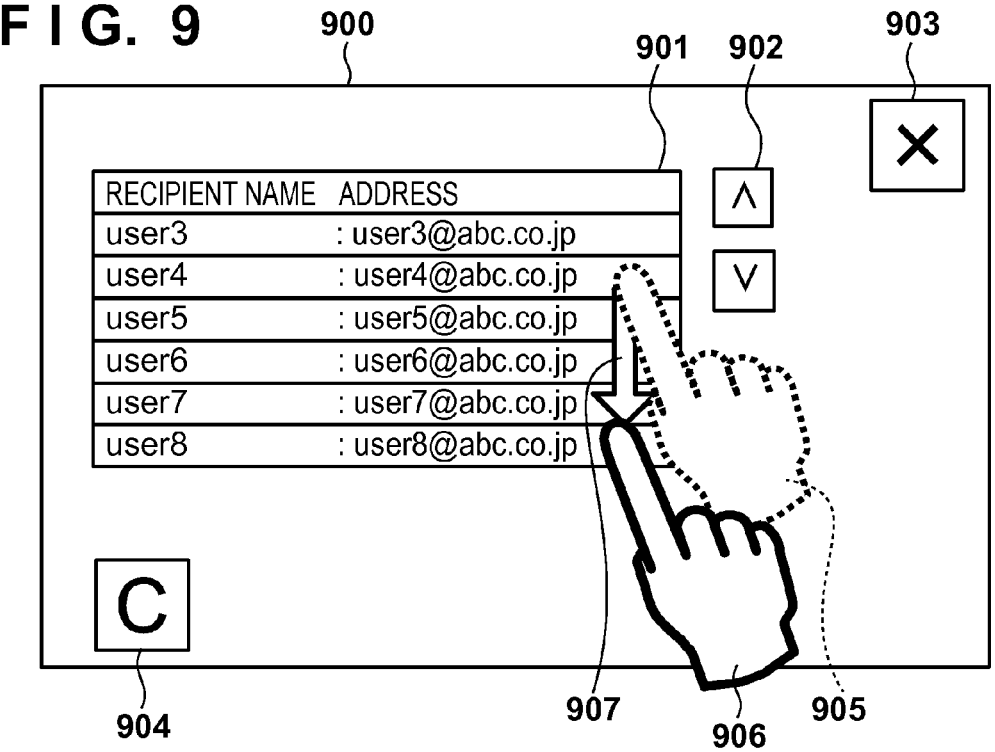
FIG. 9 is a diagram illustrating a slide operation by flicking down on an address book.

Similarly, a slide operation by flicking on an address book list will be described with reference to FIG. 9. FIG. 9 is a diagram illustrating a slide operation by flicking in the lower direction on an address book.

On a list screen 900, an address book list display portion 901, list scroll buttons 902, a screen close button 903, and a list display update button 904 are displayed. In FIG. 9 as well, a predetermined gesture manipulation is to move in the upper and lower directions. FIG. 9 shows an example of flicking in the lower direction by performing a manipulation of tapping the finger at a position indicated by 905, dragging the finger in the lower direction as indicated by an arrow 907, and lifting the finger at a position indicated by 906 while maintaining the velocity. As a result, a list corresponding to the upper page is displayed by sliding. Flicking in the opposite direction (upper direction) causes a list corresponding to the lower page to be displayed by sliding.

In this example as well, the list display page is expressed by the first row of the list displayed on the list screen. Specifically, in the case of the display shown in FIG. 9, if the address book data 415 is data shown in FIG. 11, the displayed page is "0003". Then, by a slide operation by flicking as described above, "user 3: user3@abc.co.jp" is slid in the lower direction, and at the time when a row above the first row needs to be displayed, it is determined in S611 that the displayed page extends beyond the currently displayed page. Then, the displayed page is updated to "0002" based on the data shown in FIG. 11. On the other hand, if a slide operation in the upper direction is performed by flicking in the upper direction, at the time when "user 3: user3@abc.co.jp" is no longer displayed, it is determined in S611 that the displayed page extends beyond the currently displayed page. Then, the displayed page is updated to the next page "0004" based on the data shown in FIG. 11.

Operations from flicking are basically the same between the list display for showing a preview as shown in FIG. 3 and the list display for showing a list of character strings as shown in FIGS. 8 and 9. In other words, in either case, a change in velocity as shown in FIG. 5 is observed in which the velocity decreases gradually from the initial velocity at the time when the user has lifted the finger, and finally stops.

If it is determined at a point Tc in FIG. 5 that there is a rapid stop instruction, the curve indicating a change in velocity changes from FIG. 5 to FIG. 12. As a result, the slide operation stops at Tce 1201, which is earlier than Te 505.

Figure 12:
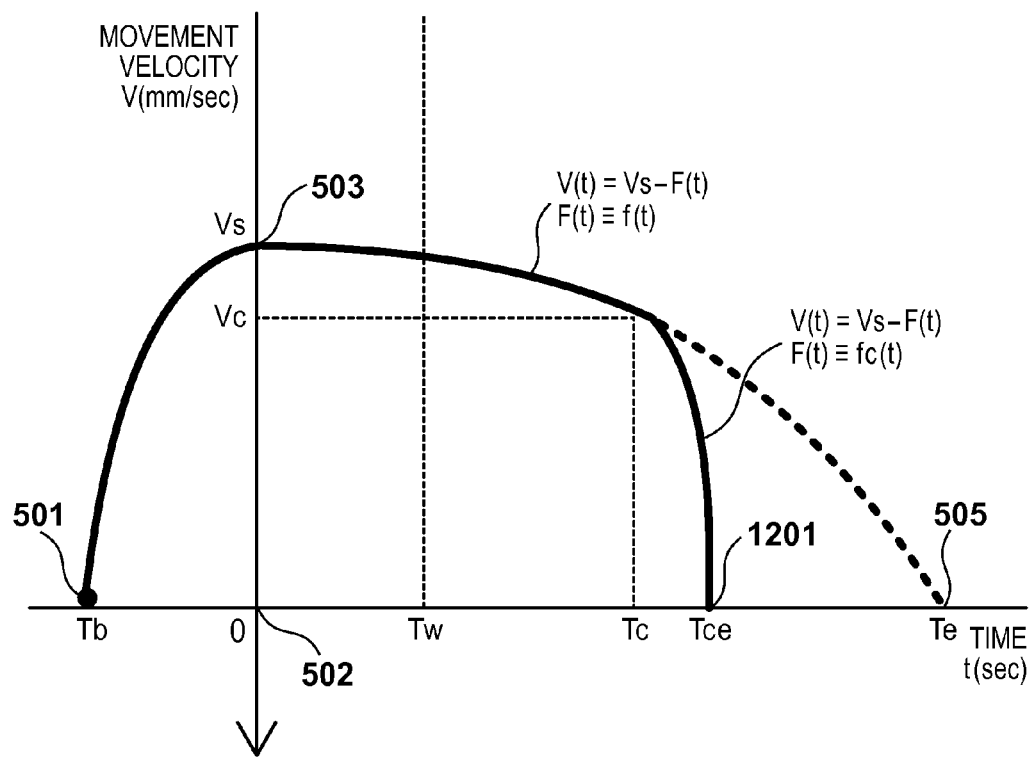
FIG. 12 is a diagram illustrating a velocity curve of a slide operation in the case where there is a rapid stop instruction.

FIG. 12 is a diagram illustrating a velocity curve of a slide operation in the case where there is a rapid stop instruction. In FIG. 12, elements that are common to those of FIG. 5 are indicated by the same reference numerals. In this case, as described above in S608 of FIG. 6, as a deceleration formula F(t), the rapid deceleration formula fc(x) is loaded to perform calculation.

A list screen display operation according to Embodiment 1 of the present invention will be described next with reference to the flowchart shown in FIG. 13.

FIG. 13 is a flowchart illustrating an operation of the list display module according to Embodiment 1 of the present invention. A program that executes this flowchart has been installed on the HDD 14, and is expanded into the RAM 13 at the time of execution, and then executed under control of the CPU 10. This processing is not dependent on how items are expressed (in the form of a preview, thumbnail, list or the like).

First, the list display processing starts when a list screen as shown in FIG. 3, 8 or 9 opens. In S1301, the displayed page is set to "1". The displayed page indicates, as described above, an image displayed at the center in the case of the list display shown in FIG. 3, and indicates the first row in the case of the list display shown in FIG. 8 or 9. Next, the procedure advances to S1302, where the item information (the job list data 413, the document management data 414, or the address book data 415) of the displayed page that has been set is read from the item management module (403 to 405) and displayed. Specifically, in the case of the above example in which the displayed page is set to 1, if the storage document shown in FIG. 7 is displayed in FIG. 3, the displayed page is "00001". Then, its document name "Doc1" is read from a storage address "/BOX/Document/Doc1" and displayed. Alternatively, if the job list shown in FIG. 10 is displayed in FIG. 8, the displayed page is "0001", and then its job name "job1", and user name "user1" are read and displayed.

Next, the procedure advances to S1303, where listener registration on item changes in the item management modules (403 to 405) is performed. With this processing, when a change occurs in the displayed items and the item management modules (403 to 405) issue an item change (EVENT), the item change (EVENT) is notified to the list display module serving as a listener. Thereafter, in steps S1304 to S1306, whether the item change (EVENT) set in S1303 has been received, whether the list display update button has been pressed, and whether the close button has been pressed are monitored, respectively.

In S1304, it is determined whether the item change (EVENT) has been received. If it is determined that the item change has been received, the procedure advances to S1307, where it is determined whether slide display is currently performed. Whether slide display is currently performed is determined by determining whether velocity (Vs−F(t))>0. If it is determined in this step that slide display is not currently performed, the procedure advances to S1308, where the same processing as in S1302 is performed, the display is updated, and the procedure returns to S1304.

If, on the other hand, it is determined in S1307 that slide display is currently performed, the procedure advances to S1309, where the elapsed time t 408 from the start of the slide operation is acquired, and it is determined whether the predetermined period of time Tw 410 has elapsed (t−Tw≥0). In S1309, if it is determined that the predetermined period of time has elapsed, the procedure advances to S1310, where an instruction to rapidly stop the slide operation is issued (407). At the same time, the list display update button is displayed in a normal manner (if S1314, which will be described later, has already been executed and the list display update button is displayed in a highlighted manner, the highlighted display is deactivated). In response to the rapid stop instruction issued, as described above in connection with the slide operation, the rapid stop instruction is received in S608 (FIG. 6), and the velocity changes in the manner described in connection with the rapid stopping with reference to FIG. 12. Then, in S1311, it is determined whether the velocity has stopped. If velocity (Vs−F(t))>0, it is determined that the velocity has not stopped, and the procedure waits until the velocity stops. If it is determined that the velocity has stopped, the procedure advances to S1308.

Figure 14:
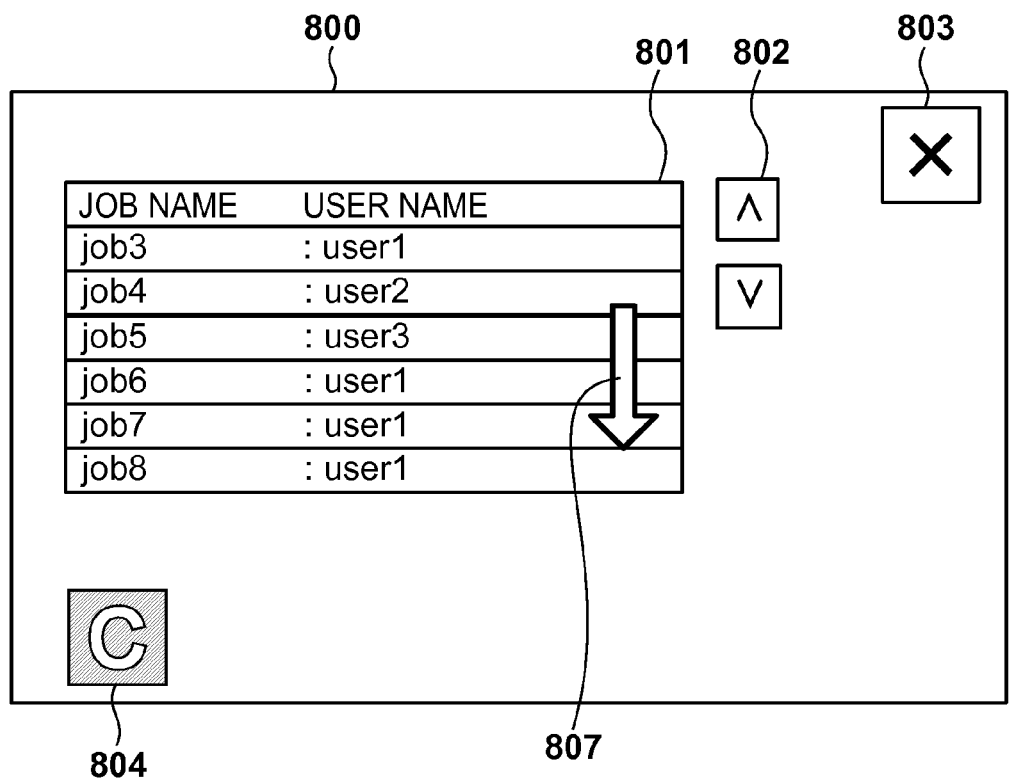
FIG. 14 is a diagram illustrating a list display update button being displayed in a highlighted manner.

If, on the other hand, in S1309, (t−Tw)<0, and it is determined that the predetermined period of time has not elapsed, the procedure advances to S1312, where it is determined whether the display data cache 406 acquired in step S1302 or S1308 and stored has been used up. If it is determined that the display data cache 406 has been used up, the list display module 401 cannot perform display by using only the data stored in the display data cache 406, and thus it is necessary to acquire the latest information that is to be displayed. In this case, the procedure advances to S1310. Otherwise, the procedure advances to S1313. In S1313, because the display data cache 406 has not been used up, it is determined whether an edge of the list display (any of the upper, lower, right and left edges) has been reached. If it is determined that an edge has been reached, the procedure advances to S1310. If it is determined in S1313 that an edge has not been reached, the procedure advances to S1314, where, taking FIG. 8 as an example, the list display update button 804 (or 308 in the case of FIG. 3) is displayed in a highlighted manner. In Embodiment 1 of the present invention, the highlighted display is performed by reverse display, and a screen as shown in FIG. 14 is obtained. If it is determined in S1313 that an edge has been reached, it is necessary to display items that have not yet been displayed, and thus the need for acquiring the latest information that is to be displayed is generated, and the procedure advances to S1310.

FIG. 14 is a diagram illustrating the list display update button being displayed in a highlighted manner. Elements that are common to those of FIG. 8 are indicated by the same reference numerals.

Here, the highlighted display may be performed by any method, and in the case of color display, the displayed color can be changed. Furthermore, the button 804 may be framed. Alternatively, the button 804 itself or the frame of the button 804 may be blinked. If the screen does not have the list display update button 804 (or 308 or 904 in the case of FIG. 3 or 9), the object that is to be displayed in a highlighted manner may be another display element. Alternatively, the entire screen may be displayed in a highlighted manner, or an icon may be displayed in a conspicuous location on the screen. Alternatively, a message indicating that the list has been updated may be displayed. What is important is that the user can recognize that the displayed list of items have been updated during slide operation of the list display. Accordingly, not only the screen but also sound may be used. Generally, the manipulation unit 20 is provided with a beeper (not shown), and thus the beeper can be used to alarm the user. Alternatively, if a voice guidance function is provided, the purpose can be achieved using voice, specifically, by outputting a message similar to the above message with voice.

The foregoing has been described taking the case where the list display is slid by using a gesture manipulation by the user, as an example. However, an object of the present embodiment is to, when a change occurs in the items displayed on the list screen during a slide operation, inform the user of that fact, and therefore how to perform the slide operation is not important.

Accordingly, for example, a configuration may be possible in which the scroll velocity is increased according to the duration of time in which the page scroll buttons 303 of FIG. 3, or the list scroll buttons 802 or 902 of FIG. 8 or 9 are pressed. Alternatively, the present invention can be implemented with a configuration capable of scrolling the display by using a device such as the dial 206 or the trackball 207 shown in the schematic diagram of the manipulation unit 20 of FIG. 2. In this case, the time when the user lifts the finger from the button or stops an instruction operation of the device corresponds to t=0 (502) shown in FIG. 5.

As described above, according to Embodiment 1 of the present invention, when the user is sliding the list screen by flicking, if there is a change in the items of the list screen, the user can be notified of that fact. Also, when the user is sliding the list screen by flicking, if there is a change in the items of the list screen, the slide operation can be rapidly stopped so that the user can easily check the changed item(s). In this case, a predetermined condition may be set such as a condition that a predetermined period of time has elapsed from the start of the slide operation, so as to avoid frequent stopping of the slide operation. In other words, the slide operation does not stop unless the predetermined condition is satisfied, and it is therefore possible to prevent the slide operation from frequently stopping, as well as preventing impairment of ease of manipulation and visibility of the slide display.

Embodiment 2

In Embodiment 1 described above, a rapid stop instruction of the slide operation due to a change in the items is issued using a condition "whether a predetermined period of time has elapsed from the start of the slide operation" (S1309). In Embodiment 2, an example will be described in which an item change attribute is added to the item change (Event), and a rapid stop instruction of the slide operation due to a change in the items is issued by the item management modules determining "whether there is a specific item change attribute". The configuration and the like of the MFP 100 according to Embodiment 2 is the same as that of Embodiment 1, and thus a description thereof is omitted.

Figure 15:
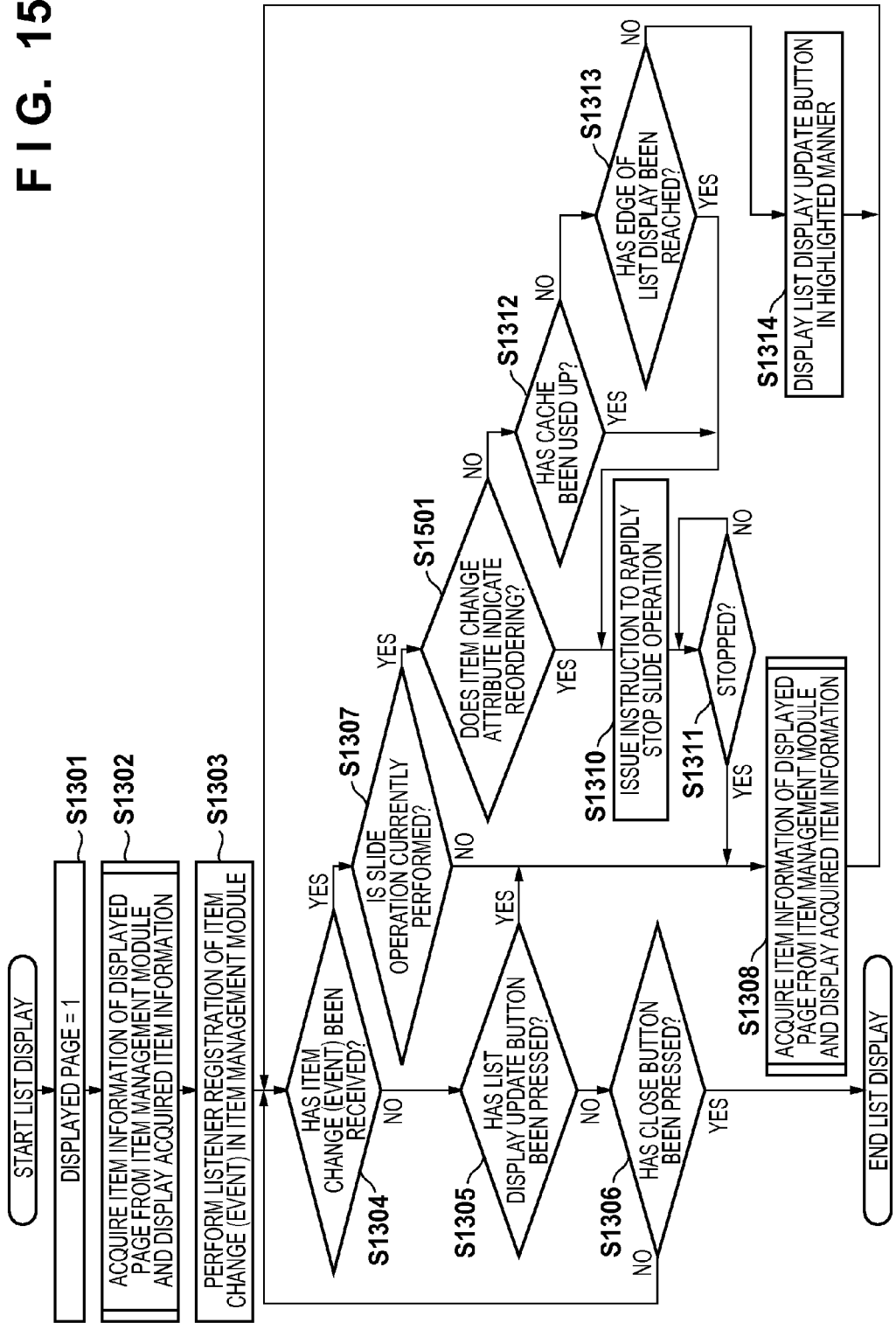
FIG. 15 is a flowchart illustrating an operation of a list display module according to Embodiment 2 of the present invention.

FIG. 15 is a flowchart illustrating a list display operation according to Embodiment 2 of the present invention. The processing steps that are the same as those of FIG. 13 described above are indicated by the same reference numerals, and a description thereof is omitted here.

Steps S1301 to S1308 and steps S1310 to S1314 in FIG. 15 are the same as those of Embodiment 1 described above with reference to FIG. 9, and thus a description thereof is omitted.

Here, in S1307, if it is determined that slide display is currently performed, the procedure advances to S1501, where it is determined whether an item change attribute of the received item change (Event) indicates reordering. In S1501, if it is determined that the item change attribute indicates reordering, the procedure advances to S1310, where an instruction to rapidly stop the slide operation is issued. If, on the other hand, it is determined in S1501 that the item change attribute does not indicate reordering, the procedure advances to S1312, where it is determined whether the display data cache 406 acquired in S1302 or S1308 and stored has been used up. Then, if it is determined that the display data cache 406 has been used up, S1310 is executed.

As described above, according to Embodiment 2, the slide operation can be rapidly stopped with the first item of reordering in the slide operation without waiting for the elapse of a predetermined period of time from the start of the slide operation as in S1309 of FIG. 13. Also, the slide operation is rapidly stopped when the item change attribute indicates a change in the order of items, and thus the user can easily check that the order of items has been changed during the slide operation.

Embodiment 3

In Embodiment 1 described above, a rapid stop instruction of the slide operation due to a change in the items is controlled using a condition "whether a predetermined period of time has elapsed from the start of the slide operation" in S1309. In Embodiment 3, an example will be described in which a rapid stop instruction of the slide operation due to a change in the items is issued using a condition "time (w) elapsed from a notification of the previous change exceeds a predetermined period of time (Wt)".

FIG. 16 is a flowchart illustrating a list display operation according to Embodiment 3 of the present invention. The processing steps that are the same as those of FIG. 13 described above are indicated by the same reference numerals, and a description thereof is omitted here.

First, in S1601, the displayed page is set to 1. Also, the time (w) elapsed from a notification of the previous change is initialized so as to be greater than the predetermined period of time (Wt) (w=Wt+1). This is to notify a first item change. The processing of steps S1302 to S1307 is the same as that of Embodiment 1 described above with reference to FIG. 13.

In S1307, if it is determined that slide display is currently performed, the procedure advances to S1602, where it is determined whether the time (w) elapsed from a notification of the previous change has exceeded the predetermined period of time (Wt) (w−Wt≥0). If (w−Wt)≥0, and it is determined that the predetermined period of time has elapsed, the procedure advances to S1603, where an instruction to rapidly stop the slide operation is issued. At the same time, the list display update button is displayed in a normal manner (if S1314 has already been executed and the list display update button is displayed in a highlighted manner, the highlighted display is deactivated). At the same time, w is set to 0 (w=0). If, on the other hand, it is determined in S1602 that the predetermined period of time has not elapsed, the procedure advances to S1312, where the same processing as in FIG. 13 described above is executed.

As described above, according to Embodiment 3, the slide operation can be rapidly stopped when a predetermined period of time has elapsed from a notification of the previous change. With this configuration, it is possible to avoid, for example, a situation in which the slide operation stops when a change in the items occurs frequently (when one-page printing is performed many times).

Variation of Embodiment 3

FIG. 16 corresponding to Embodiment 3 is changed as follows. Specifically, a rapid stop instruction of the slide operation due to a change in the items may be issued using a condition "the number (w) of notifications from a notification of the previous change has reached a predetermined number of times (Wt)", instead of the condition "the time (w) elapsed from a notification of the previous change has exceeded a predetermined period of time (Wt)". The processing in this case can also be executed in accordance with the flowchart shown in FIG. 16.

With this configuration, the slide operation can be stopped rapidly when the number (w) of notifications from a notification of the previous change has reached a predetermined number of times (Wt). It is thereby possible to avoid, for example, a situation in which the slide operation stops when a change in the items occurs frequently (when one-page printing is performed many times).

OTHER EMBODIMENTS

The above embodiments can be combined to constitute a single apparatus. In this case, the apparatus may be configured such that the operations described in the above respective embodiments are provided as operation modes and are automatically switched according to the desired condition. Alternatively, the operations may be switched manually in response to an instruction from the user.

Also, in the description of the embodiments given above, a job list and an address book list are used as examples of the displayed list of items, but the present invention is applicable to various other items displayed in a list.

Also, in the description of the embodiments given above, an MFP is used as an example of an apparatus that implements the present invention, but the apparatus that implements the present invention is not limited to MFPs. In other words, the present invention is applicable to not only MFPs, but also image processing apparatuses that can process at least image data, including image forming apparatuses such as a printing apparatus, a scanner, a FAX and a digital camera, and information processing apparatuses such as a PC and a personal digital assistant.

Also, in the description of the embodiments given above, flicking is used as an example of a manipulation performed by the user to perform slide display. However, the present invention can be implemented without limiting the manipulation by the user for performing slide display to flicking. For example, the present invention can be implemented even if slide display is performed by a manipulation other than flicking on a touch panel. In other words, the present invention can be implemented as long as the displayed list is displayed by sliding by a predetermined manipulation by the user. The predetermined manipulation as used herein may be a gesture manipulation performed by touching a touch panel, or a gesture manipulation performed without touching a touch panel (so-called a spatial gesture manipulation), other than flicking on a touch panel. Also, the lists to be displayed by sliding are not limited to those displayed on a display unit provided with a touch panel, and may be projected onto some kind of screen by using an image projection apparatus such as a projector. Then, the projected image may be displayed by sliding by performing a predetermined gesture manipulation (spatial gesture or the like).

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-026424, filed Feb. 9, 2012, which is hereby incorporated by reference herein in its entirety.

What is claimed is:

1. An image processing apparatus that displays a list of items, the apparatus comprising:
    a display unit configured to display the list of items by scrolling in response to a user instruction operation;
    a determination unit configured to determine whether or not there is a change in an item of the list of items scrolled by the display unit, wherein the change is a reordering of items in the list;
    a control unit configured to, in a case where the determination unit determines that there is the change in the item of the list of items scrolled by the display unit, stop the scrolling of the displayed list of items to permit the user to view the item for which it is determined that there is the change and which is displayed by the display unit; and
    a notification unit configured to display a display element in a highlighted manner to notify a user that there is the change in the item of the list of items scrolled by the display unit,
    wherein at least one of the display unit, the determination unit, the control unit, and the notification unit is implemented by a processor.

2. The image processing apparatus according to claim 1, further comprising a notification unit configured to display a display element in a highlighted manner to notify a user that there is the change in the item of the list of items scrolled by the display unit.

3. The image processing apparatus according to claim 1, wherein the user instruction operation is a gesture manipulation for sliding a displayed screen.

4. The image processing apparatus according to claim 1, wherein the list of items includes at least one of a job list, a document list and an address book list.

5. The image processing apparatus according to claim 1, wherein the determination unit performs a determination based on a notification of an event of the change from management modules that respectively manage the job list, the document list and the address book list.

6. The image processing apparatus according to claim 1, wherein scrolling by the display unit is stopped earlier than originally configured to stop, by increasing a deceleration rate of scrolling.

7. The image processing apparatus according to claim 1, further comprising an acquiring unit configured to acquire the list of items,
wherein the display unit displays the list of items acquired by the acquiring unit by scrolling.

8. The image processing apparatus according to claim 1, further comprising a second determination unit configured to, in a case where the determination unit determines that there is the change in the item of the list of items scrolled by the display unit, determine whether a predetermined condition is satisfied,
wherein in a case where the predetermined condition is satisfied, the control unit stops the scrolling of the displayed list of items to permit the user to view the item for which it is determined that there is the change.

9. The image processing apparatus according to claim 8, wherein the predetermined condition is a condition that a predetermined period of time has elapsed from start of scrolling by the display unit.

10. The image processing apparatus according to claim 8, wherein the predetermined condition is a condition that a predetermined period of time has elapsed from a notification of a previous change in an item of the list of items.

11. The image processing apparatus according to claim 8, wherein the predetermined condition is a condition that it is determined that there are a predetermined number of changes after a notification of a previous change in an item of the list of items.

12. The image processing apparatus according to claim 8, wherein the predetermined condition is an occurrence of reordering of items of the list.

13. The image processing apparatus according to claim 7, wherein in a case where scrolling of the list of items is stopped, the acquiring unit acquires the list of items.

14. The image processing apparatus according to claim 2, wherein the notification unit displays the display element in the highlighted manner to notify the user that there is the change in the item of the list of items scrolled by the display unit, while scrolling is performed.

15. A control method for controlling an image processing apparatus that displays a list of items, the method comprising:
a display step of displaying the list of items by scrolling in response to a user instruction operation;
a determining step of determining whether or not there is a change in an item in of the list of items scrolled by the display step, wherein the change is a reordering of items in the list;
a control step of, if it is determined in a case where the determining step determines that there is the change in the item of the list of items scrolled by the display step, stopping the scrolling of the displayed list of items displayed in the display step to permit the user to view the item for which it is determined that there is the change and which is displayed by the display step; and
a notification step of displaying a display element in a highlighted manner to notify a user that there is the change in the item of the list of items scrolled by the display unit.

16. A non-transitory computer-readable storage medium storing a program that causes a computer to execute the following steps:
a display step of displaying a list of items by scrolling in response to a user instruction operation;
a determining step of determining whether or not there is a change in an item of the list of items scrolled by the display step, wherein the change is a reordering of items in the list;
a control step of, in a case where it is determined in the determining step that there is the change in the item of the list of items scrolled by the display step, stopping the scrolling of the displayed list of items displayed in the display step to permit the user to view the item for which it is determined that there is the change and which is displayed by the display step; and
a notification step of displaying a display element in a highlighted manner to notify a user that there is the change in the item of the list of items scrolled by the display unit.

* * * * *